(No Model.)
P. KEENE.
SPREADER ATTACHMENT.
No. 440,637.
Patented Nov. 18, 1890.
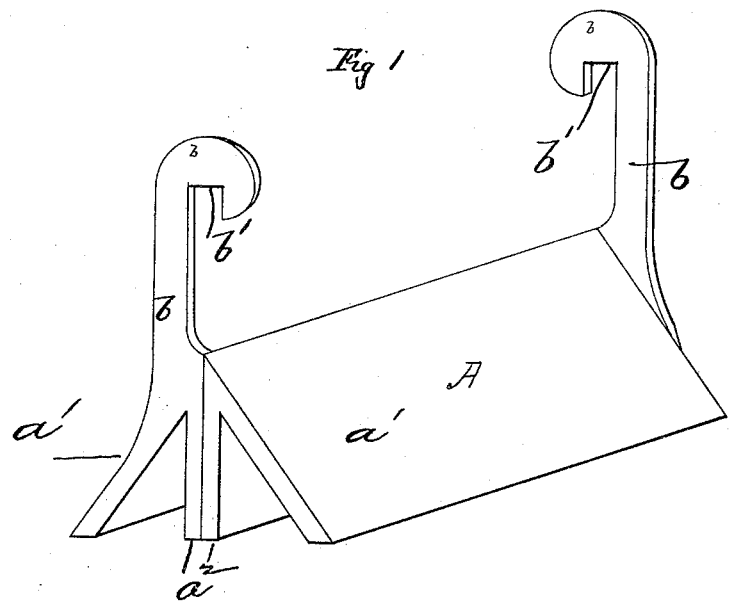
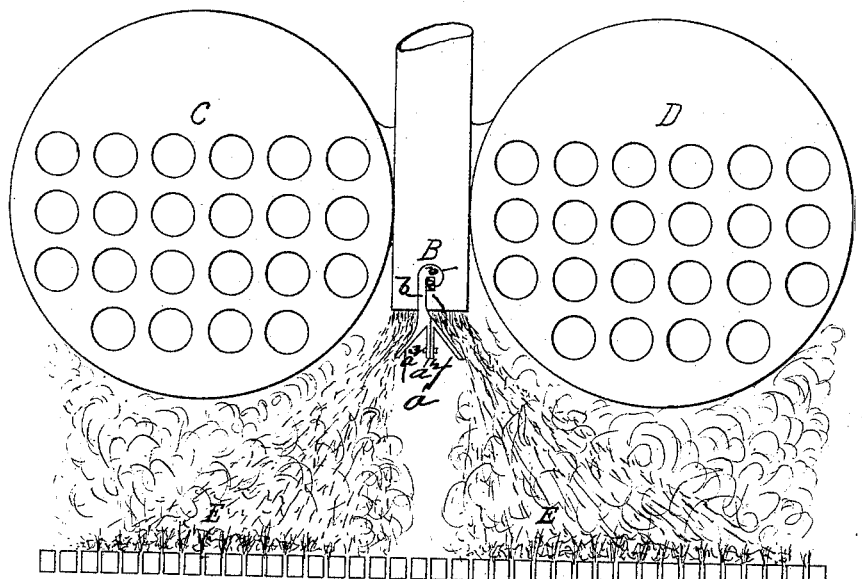

UNITED STATES PATENT OFFICE.

PHILIP KEENE, OF MOLINE, ILLINOIS.

SPREADER ATTACHMENT.

SPECIFICATION forming part of Letters Patent No. 440,637, dated November 18, 1890.

Application filed March 17, 1890. Serial No. 344,175. (No model.)

*To all whom it may concern:*

Be it known that I, PHILIP KEENE, a citizen of the United States, residing at Moline, in the county of Rock Island and State of Illinois, have invented certain new and useful Improvements in Spreader Attachments; and I do hereby declare the following to be a full, clear, and exact description of the invention, such as will enable others skilled in the art to which it appertains to make and use the same.

My invention relates to improvements in the method of feeding shavings and dust collected by a centrifugal collector from machines to the furnace, and spreading directly under the boilers; and the object of my improvement is to render the work easy and effectual. I attain this object by a piece of mechanism attached to a supply-pipe which is connected to a receptacle of shavings and dust gathered from machines, as illustrated in the accompanying drawings, in which—

Figure 1 is a perspective view of the attachment A, as shown, detached from supply-pipe. Fig. 2 is a view of supply or discharge pipe B, with the spreader attachment A, as appears when connected, showing the manner of its operation.

Similar letters refer to different parts throughout both views.

In the drawings, C and D represent two boilers arranged above the grate F, and between the boilers is arranged the supply-pipe B, which feeds the material to the fire, and on each side of the supply-pipe are lugs $a$, which are preferably square or rectangular.

The spreader attachment A consists of two parts or inclined walls $a'$, each formed with a vertical rib or wall $a^2$, through which the fastening-bolts $a^3$ pass, and one of the parts $a'$ is formed with an arm $b$ at each end which fits over the end of the supply-pipe, and the ends are hooked and formed with angular notches $b'$ to engage the lugs $a$ on the pipe and support the spreader on said pipe, whereby the material falls from the pipe on the inclined walls of the spreader and is distributed, as at E, equally on the fire.

I am aware that pipes and other devices for feeding shavings and dust to furnaces have been made and used. I therefore do not claim the combination, broadly; but What I do claim, and desire to secure by Letters Patent, is—

1. The combination of the boilers, the grate, the pipe between the boilers having the lugs, the spreader having the two inclined walls, and the arms, one on each end of the spreader, fitting over the end of the pipe and having hooks engaging the lugs on the supply-pipe, as shown and described.

2. A spreader consisting of the two inclined parts having vertical ribs for receiving fastenings, and arms on one of the parts formed with attaching-hooks, as described.

In testimony whereof I have affixed my signature in presence of two witnesses.

PHILIP KEENE.

Witnesses:
PETER INGELSON,
CHARLES PIPER.